Patented Feb. 22, 1938

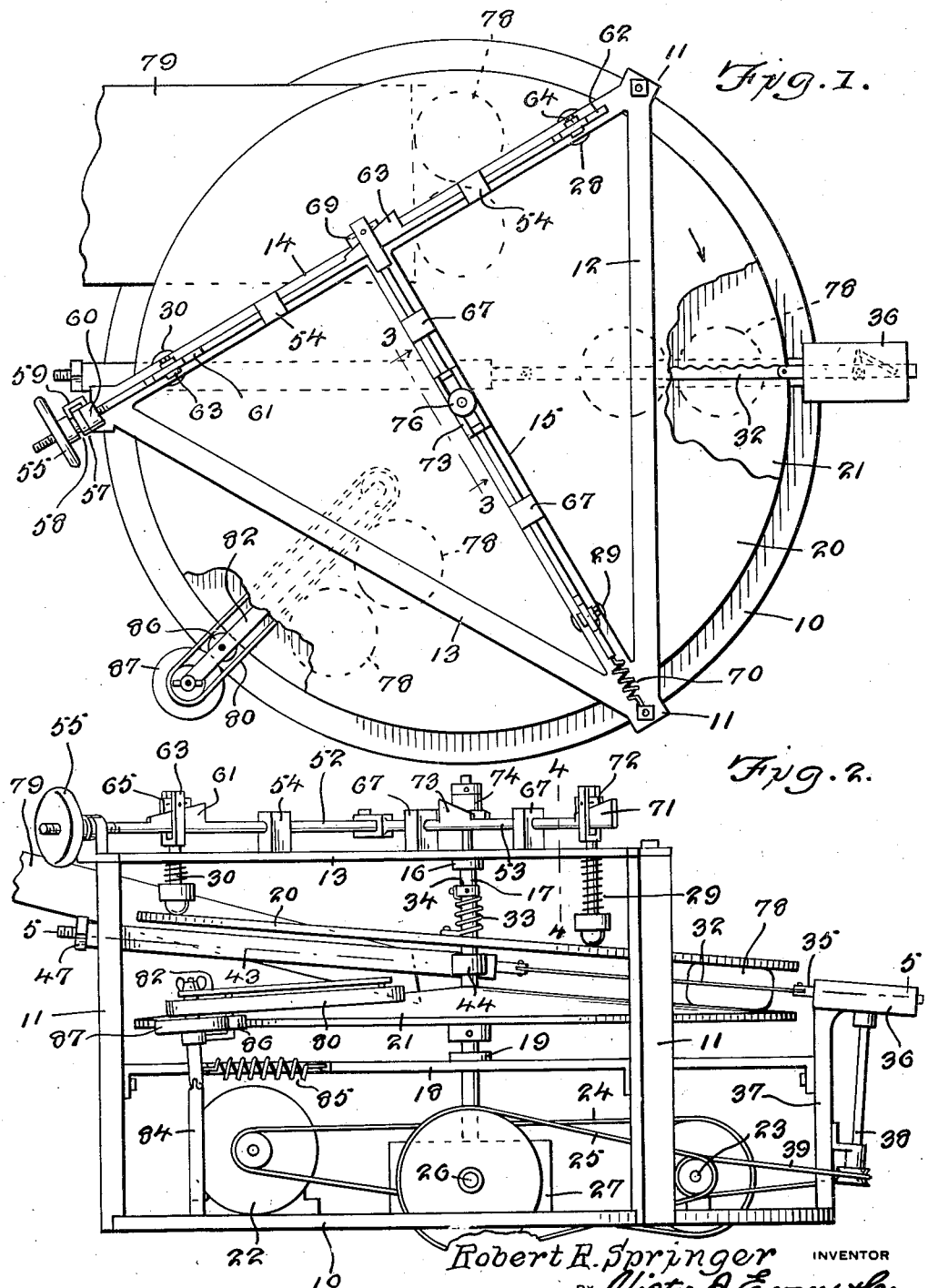

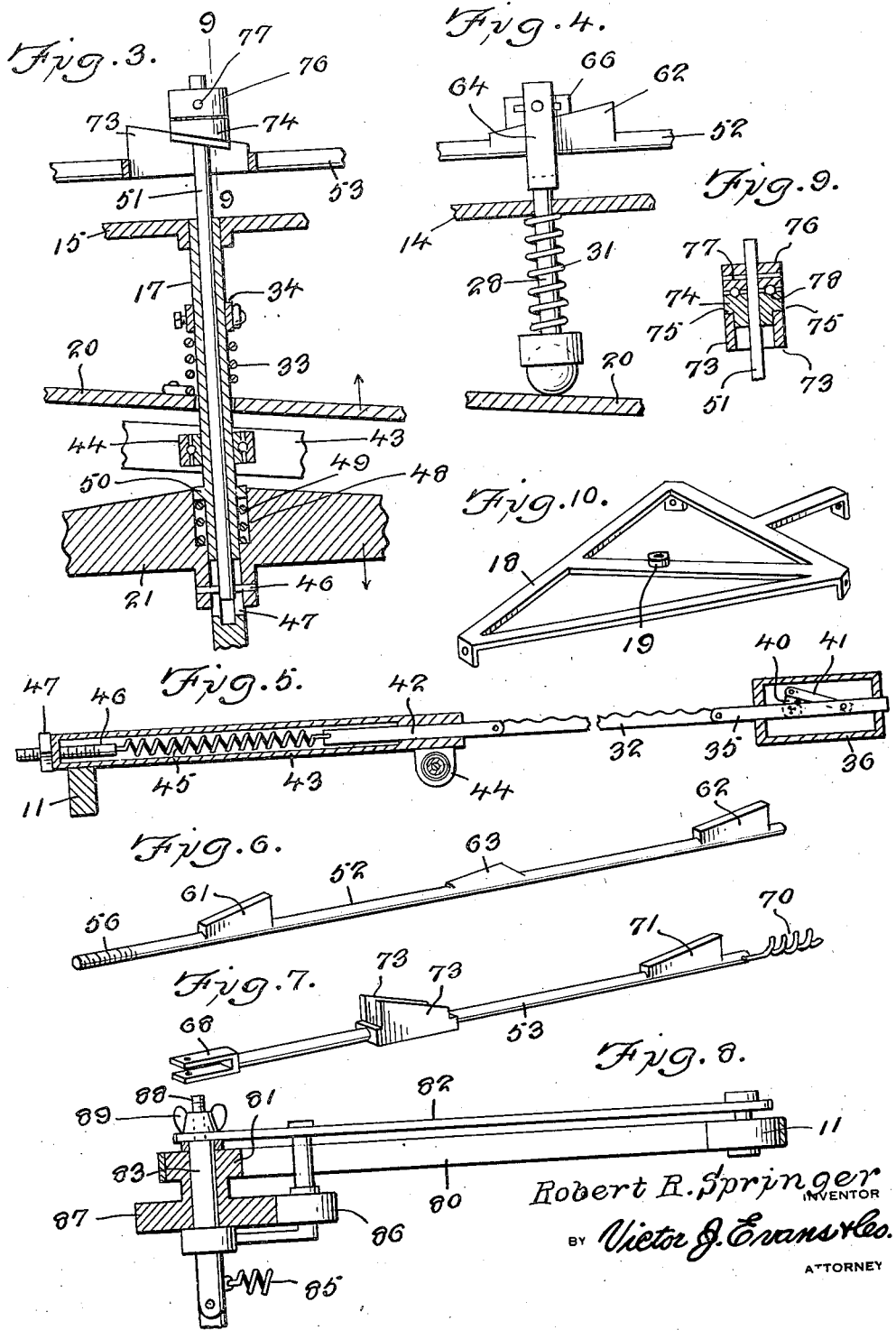

2,109,438

UNITED STATES PATENT OFFICE 2,109,438

BUN SLICING MACHINE

Robert R. Springer, Harrison, Ark., assignor of one-half to William W. McKinney, Harrison, Ark.

Application November 14, 1936, Serial No. 110,936

4 Claims. (Cl. 146—72)

This invention relates to machines for slicing buns, rolls, cake and the like and has for an object to provide concentric rotary discs one of which is canted with respect to the other so that the buns or the like may be fed into the machine at a point between the discs where the discs are spaced widely apart and carried by the discs to a point where the space between the discs is narrow at which point the traveling bun is intercepted by a reciprocatory knife and cut thereby entirely through, after which operation the halved bun is delivered from the machine at a point where the discs are wide apart. Consequently the bun is only clamped firmly by the discs while being cut by the knife and is free during the remainder of its journey and thus will not be crushed or distorted in any manner from its normal condition during its passage through the machine.

A further object is to provide novel means for simultaneously adjusting the superposed discs vertically in opposite directions to accommodate the machine to operate upon buns of different thicknesses, as well as cakes and other baked goods.

A further object of the invention is to provide a machine of this character which will be formed of a few strong simple and durable parts, which will be inexpensive to manufacture and operate, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of a bun slicing machine constructed in accordance with the invention.

Figure 2 is a side elevation of the machine shown in Figure 1.

Figure 3 is a cross sectional view taken on the line 3—3 of Figure 1 showing the shaft and discs adjustably mounted thereon.

Figure 4 is a cross sectional view taken on the line 4—4 of Figure 2 showing one of the three ball tipped spring pressed pins which determine the cant or inclination of the upper disc with respect to the lower disc.

Figure 5 is a cross sectional view taken on the line 5—5 of Figure 2 showing the reciprocating knife and its mountings.

Figure 6 is a detail perspective view of one of the wedge rods for adjusting the discs vertically with respect to each other.

Figure 7 is a detail perspective view of the companion wedge rod for adjusting the discs vertically.

Figure 8 is a side elevation of the delivery belt with parts in section.

Figure 9 is a detail sectional view taken on the line 9—9 of Figure 3.

Figure 10 is a perspective view, drawn to reduced scale, of the bottom bearing frame for the shaft.

Referring now to the drawings in which like characters of reference designate similar parts in the various views, the machine is shown to comprise a bed plate 10 from which rise legs 11, preferably three in number, to the upper ends of which is bolted a substantially triangular frame having side bars 12, 13 and 14 and a center bar 15 which latter is provided with a bearing 16 for the upper end of a shaft 17. A frame 18, shown best in Figure 10, and similar to the frame just described, is secured to the legs 11 and is provided with a bearing 19 for the shaft 17.

A pair of superposed discs 20 and 21 are mounted concentrically upon the shaft 17. The upper surface of the lower disc is in the form of a comparatively flat cone. The upper disc 20 is canted on the shaft, that is, is arranged at an angle to the shaft, which angle is approximately the same as the angular inclination of the conical upper surface of the lower disc 21 so that, as best shown in Figure 2, the discs 20 and 21 are spaced comparatively wide apart at one end of the machine and at a diametrically opposite point the space between the discs is comparatively narrow.

As a result of this construction the buns or other baked material may be fed between the discs at a point where the discs are widely spaced apart and will be carried around wedged between the discs at the point where the discs are nearest together so that the bun is held firmly only momentarily while being cut by the knife as will be presently described, and during the remainder of its path from entering the machine to leaving the machine will not be gripped by the discs and consequently cannot be crushed or distorted in any manner.

The shaft 17 is power driven by an electric motor 22 which is mounted on the bed plate 10. The motor is connected to a countershaft 23 by a reduced belt drive 24 and the countershaft is connected by a reducing belt drive 25 to the shaft 26 of a reducing motion transmission mechanism 27 of conventional type which in turn is connected to the bottom of the shaft 17 and rotates the shaft.

The cant of the upper disc 20 is determined by preferably three ball tipped pins 28, 29 and 30, one of which is shown in Figure 4. Two of the pins 28 and 29, are of the same length, and the pin 30 is a short pin, as shown in Figure 2, and all three pins simultaneously are urged downwardly upon the upper disc by expansion springs 31. The two long pins are positioned on the upper triangular frame in such manner as to be on opposite sides of the hereinafter described knife 32, as best shown in Figure 1, while the short pin 30 is disposed on the upper triangular frame approximately in prolongation of the knife.

A contraction spring 33 is fixed to the upper disc 20 and is fixed to an adjustable collar 34 on the shaft and this spring tends constantly to pull the disc up against the pins 28, 29 and 30. The long pins 28 and 29 and the short pin 30, disposed relatively to each other as above described, form stops which cause the upper disc 20 to assume a cant on the shaft and slope from the short pin 30 downwardly toward the long pins 28 and 29 and thus provide for the wide spacing apart of the discs at the intake and discharge ends of the machine and the close spacing of the discs at the reciprocating knife for the purpose above described.

The knife 32 is a thin blade with a wavy cutting edge, the blade being secured at one end to a rod 35, as best shown in Figure 6, which is mounted to reciprocate in a casing 36 disposed on the upper end of a short leg 37 which rises from the bed plate 10 as best shown in Figure 2. The knife is reciprocated by means of a shaft 38 which is connected by a belt drive 39 to the countershaft 23. The shaft enters the casing 36 and is connected by a crank 40 and pitman 41 to the rod 35.

The opposite end of the knife is connected to a rod 42 which is slidably fitted in an elongated cylindrical housing 43 that is provided at one end with a laterally disposed ball bearing assembly 44 that receives the shaft 17 as best shown in Figure 3. The opposite end of the housing is fixed to the side of one of the legs 11 as best shown in Figures 2 and 5. A spring 45 is concealed in the housing, one end of the spring being connected to the rod 42 and the other end of the spring being adjustably secured in the housing by means of a threaded pin 46 and a nut 47 so that the tension of the spring may be regulated.

The knife 32 is disposed substantially midway between the upper disc 20 and the lower disc 21 and extends parallel with the upper disc 20, as best shown in Figure 2. The purpose of the spring 45 is to maintain the knife taut.

The superposed discs 20 and 21 are mounted on the shaft 17 for rotation as a unit and also are mounted on the shaft for vertical adjustment relative to each other to permit of various sizes of buns, cakes and the like being received between the discs. The upper disc 20 is attached to the shaft as previously stated by the spring 33. The lower disc 21 is attached to the shaft by means of a pin 46 which extends through a vertical slot 47 in the shaft to permit vertical adjustment of the disc. A helical spring 48 is seated in a recess 49 in the upper surface of the disc and abuts a collar 50 formed on the shaft. The spring is normally under tension and tends constantly to urge the disc 21 downwardly, for the purpose of moving the disc downwardly simultaneously with upward movement of the upper disc 20 when the discs are being adjusted vertically by mechanism which will now be described.

A rod 51 is slidably mounted in a counterbore formed in the upper end of the shaft and is connected to the pin 46 which secures the lower disc 21 to the shaft so that the rod rotates as a unit with the lower disc. The rod is normally held in a predetermined position but when released from this position will permit the spring 48 of the disc 21 to move the disc downward. When the rod is returned to normal position the disc 21 will be moved upward by the rod and pin 46.

For moving the ball tipped pins 28, 29 and 30 upward to permit the upper disc 20 to move upwardly and simultaneously releasing the rod 51 so that the lower disc can be moved downwardly by its spring 48, a pair of wedge rods 52 and 53, shown in detail in Figures 6 and 7, are employed. The wedge rod 52 is mounted to slide in bearings 54 that rise from the legs 14 of the upper triangular frame as shown in Figures 1 and 2. The rod is slid forwardly and backwardly by a hand wheel 55 having a screw thread connection with a threaded end 56 on the rod. The hub 57 of the hand wheel is grooved as shown at 58 to receive a finger 59 carried by a collar 60 that is fixed to the triangular frame. Thus when the wheel is rotated manually the wedge rod 52 is moved endwise through the wheel.

Wedges 61 and 62, best shown in Figure 6, are spaced apart on the rod 52 and are aligned with each other. A third wedge 63 extends from the rod in a plane at a right angle to the wedges 61 and 62. The wedges 61 and 62 fit in bifurcated upper ends 63 and 64 of the short ball tipped pin 30 and the long ball tipped pin 28, respectively, best shown in Figure 1. Wedges 65 and 66, shown best in Figures 2 and 4 are carried by the branches of the bifurcated upper ends of the ball tipped pins and confront the wedges 61 and 62.

Consequently when the wedge rod 52 is shifted endwise in one direction the ball tipped pins just mentioned will be moved upwardly by the wedges 61 and 62 and when the rod is shifted in the opposite direction the wedges permit the ball tipped pins to be pressed downward by their controlling springs 31.

The wedge rod 53 is mounted to slide endwise in guides 67 carried by the center bar 15 of the upper triangular frame, as shown in Figure 1. The end of the rod 53 is bifurcated, as shown at 68 to straddle the lateral wedge 63 of the companion wedge rod 52, as shown in Figure 1. A wedge 69 is carried by the bifurcated end of the wedge rod 63 and bears upon the wedge 63, as also shown in Figure 1, so that when the manually movable wedge rod 52 is moved endwise the wedge rod 53 will be moved by the coacting wedges 63 and 69 in one direction and when the manually movable wedge rod 52 is moved in the other direction a spring 70, connected to the wedge rod 53 and to the triangular frame, moves the wedge rod 53 in the opposite direction.

A wedge 71 on the wedge rod 53 coacts with a wedge 72, shown best in Figure 2, on the bifurcated upper end of the remaining long ball tipped pin 29, to move said pin simultaneously with the movement of the other ball tipped pins when the wedge rod 63 is shifted in either direction as presently explained so that the height of the upper disc 22 above the lower disc can be adjusted.

By again referring to Figure 2 it will be seen that a pair of wedge ears 73 extend from the wedge rod 53 and receive between them the shaft 51 which rotates both discs, as best shown in Figure 3. As shown in Figure 4, a collar 74 is loosely mounted on the shaft 51 so that it does not turn on the shaft, and is provided with wedge faces 75 which slidably fit the wedge ears 73. A collar 76 is pinned to the shaft as shown at 77 and rotates with the shaft and ball bearings 78 are disposed between the rotating collar 76 and loose collar 74 carrying the wedge faces.

It will be seen that when the wedge rod 53 is shifted to present the low ends of the wedge ears 73 to the collar 74 the latter will recede downwardly permitting the spring 48 of the lower disc 21 to force the disc 21 downwardly simultaneously with the movement of the ball tipped pins upwardly so that the vertical distance apart of both discs will be increased. When the wedge rod 53 is shifted to present the high ends of the wedge ears to the collar 54 the latter will be elevated and will pull up the rod 51 and through the instrumentality of the pin 46 will move the lower disc 21 upwardly simultaneously with downward movement of the upper disc by advance of the ball tipped pins thereagainst, to adjust the discs vertically with respect to each other.

The buns 78 to be halved are supplied through a trough 79 to the space between the discs at the point where the discs are widest apart. The buns are carried around in a clockwise direction and are gripped by both discs where the discs are nearest to each other, and carried past the reciprocating knife which cuts the buns or other baked articles completely therethrough. From the knife the severed buns or other articles are carried to a delivery belt 80.

The delivery belt 80 is provided with pulleys 81 which are carried by a bar 82 that is secured at one end to a shaft 83, best shown in Figure 8. The shaft is pivotally mounted on a bracket 84. A spring 85 is connected to the shaft and to the lower bearing frame 18, of the shaft 17, as shown in Figure 1, to hold a friction pulley 86 in frictional engagement of the edge of the lower disc 21. The friction pulley frictionally engages a disc 87 that is formed integral with the pulley 81 so that the delivery belt 80 is driven by the lower disc 21.

The shaft 83 is threaded at the upper end as shown at 88 to receive a nut 89 which may be loosened to permit the bar 82 to be swung on the shaft 83 as a pivot to vary the position of the belt on the lower disc 22.

From the above description it is thought that the construction and operation of the invention will be fully understood without further explanation.

What is claimed is:

1. A bun slicing machine comprising bun gripping discs arranged in facing relation and differentiated in surface contour, means for mounting said discs on a common axis of rotation to provide parallel bun gripping surfaces through part of a revolution and divergent surfaces through the remainder of the revolution, and a knife intermediately positioned between said discs in the zone of the parallel surfaces, and means for reciprocating said knife radially of said discs.

2. A bun slicing machine comprising bun gripping discs arranged in facing relation and differentiated in surface contour, means for mounting said discs on a common axis of rotation to provide parallel bun gripping surfaces through part of a revolution and divergent surfaces through the remainder of the revolution, and a knife intermediately positioned between said discs in the zone of the parallel surfaces, and adjustable means for varying the spacing between said discs without change in the intermediate position of the knife, and means for reciprocating said knife radially of said discs.

3. A bun slicing machine comprising bun gripping discs, one being canted with respect to the other and the other having a conical surface contour facing the flat disc, means for mounting said discs on a common axis of rotation to provide parallel bun gripping surfaces through part of a revolution and divergent surfaces through the remainder of the revolution, and a knife intermediately positioned between said discs in the zone of the parallel surfaces, and means for reciprocating said knife radially of said discs.

4. A bun slicing machine comprising bun gripping discs, one being canted with respect to the other and the other having a conical surface contour facing the flat disc, means for mounting said discs on a common axis of rotation to provide parallel bun gripping surfaces through part of a revolution and divergent surfaces through the remainder of the revolution, and a knife intermediately positioned between said discs in the zone of the parallel surfaces, and adjustable means for varying the spacing between said discs without change in the intermediate position of the knife, and means for reciprocating said knife radially of said discs.

ROBERT R. SPRINGER.